(12) United States Patent
Schumacher (10) Patent No.: US 10,950,844 B2
(45) Date of Patent: Mar. 16, 2021

(54) BATTERY POLE AND ELECTRICAL CONTACT UNIT FOR PRODUCING AN ELECTRICAL CONNECTION BETWEEN A BATTERY POLE AND AN ON-BOARD ELECTRICAL SYSTEM OF A VEHICLE

(71) Applicant: Daimler AG, Stuttgart (DE)

(72) Inventor: Eric Schumacher, Fasanenhof (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 15/768,465

(22) PCT Filed: Oct. 14, 2016

(86) PCT No.: PCT/EP2016/001705
§ 371 (c)(1),
(2) Date: Apr. 13, 2018

(87) PCT Pub. No.: WO2017/063745
PCT Pub. Date: Apr. 20, 2017

(65) Prior Publication Data
US 2018/0309111 A1 Oct. 25, 2018

(30) Foreign Application Priority Data

Oct. 17, 2015 (DE) ...................... 10 2015 013 472.8

(51) Int. Cl.
*H01M 2/02* (2006.01)
*H01M 2/30* (2006.01)
(Continued)

(52) U.S. Cl.
CPC ............. *H01M 2/305* (2013.01); *H01M 2/30* (2013.01); *H01M 2/34* (2013.01); *H01R 11/283* (2013.01);
(Continued)

(58) Field of Classification Search
CPC .......... H01M 2/305; H01M 2/30; H01M 2/34; H01M 2220/20; H01R 11/283; H01R 11/289; H01R 2201/26
See application file for complete search history.

(56) References Cited

U.S. PATENT DOCUMENTS 9,559,464 B2 1/2017 Yang et al.
2010/0116455 A1* 5/2010 Ratte ...................... B22D 25/04
164/120

FOREIGN PATENT DOCUMENTS

DE     102 21 057 A1    11/2003
DE  20 2010 016 520 U1   4/2011
(Continued)

OTHER PUBLICATIONS

PCT/EP2016/001705, International Search Report dated Feb. 21, 2017 (Two (2) pages).
(Continued)

*Primary Examiner* — Raymond Alejandro
(74) *Attorney, Agent, or Firm* — Crowell & Moring LLP (57) ABSTRACT

A pole cap for a battery pole of a battery has a sleeve-like contacting portion, which has an outer periphery widening conically in the direction of the battery pole and tapering conically in the direction of the battery pole. A terminal is formed as a double-walled terminal sleeve having an inner wall and an outer wall, both designed to be supported by a collar, where the walls form an annular gap for positively receiving the sleeve-like contacting portion of the pole cap and where the gap tapers in the direction of the collar.

8 Claims, 8 Drawing Sheets

(51) Int. Cl.
*H01R 11/28* (2006.01)
*H01M 2/34* (2006.01)

(52) U.S. Cl.
CPC ....... *H01R 11/289* (2013.01); *H01M 2220/20* (2013.01); *H01R 2201/26* (2013.01)

(56) References Cited

FOREIGN PATENT DOCUMENTS

| DE | 10 2013 005 962 A1 | | 10/2014 | |
|---|---|---|---|---|
| EP | 2 333 905 A1 | | 6/2011 | |
| JP | 2003-092101 | * | 3/2003 | .............. H01M 2/30 |
| JP | 2003-92101 A | | 3/2003 | |
| WO | WO 2015/054840 A1 | | 4/2015 | |

OTHER PUBLICATIONS

Korean Office Action issued in Korean counterpart application No. 10-2018-7010289 dated Mar. 5, 2019 (Seven (7) pages).
Chinese Office Action issued in Chinese application No. 201680060405.1 dated Apr. 2, 2020, with partial English translation (Nine (9) pages).

* cited by examiner

BATTERY POLE AND ELECTRICAL CONTACT UNIT FOR PRODUCING AN ELECTRICAL CONNECTION BETWEEN A BATTERY POLE AND AN ON-BOARD ELECTRICAL SYSTEM OF A VEHICLE

BACKGROUND AND SUMMARY OF THE INVENTION

The invention relates to an electrical contact unit for producing an electrical connection between a battery and an on-board electrical system of a vehicle, and a pole cap for a battery as well as a terminal for the connector on the pole cap.

A battery connection terminal for fixing an electric cable on the pole of an accumulator or similar is known from prior art, such as is described in DE 10 2013 005 962 A1. The battery connection terminal has a substantially cylindrical or conical clamping portion, with which the battery connection terminal is plugged onto the cylindrical or conical pole of the accumulator or similar in the plug-in direction. Furthermore, the battery connection terminal has a fastening portion which is fixed on the clamping portion for the electric cable, wherein the clamping portion is formed from two clamping brackets which are arranged opposite each other, curved in a flap-like manner with respect to each other and fit the shape of the pole of the accumulator, the clamping brackets engaging around the pole of the accumulator portionally on both sides, and the opposite ends of the clamping brackets which are curved in a flap-like manner form a gap between them.

Furthermore, in DE 20 2010 016 520 U1, a battery terminal for producing an electrical contact with a pole of a battery is disclosed. The battery terminal has an internal clip for producing the electrical contact with the pole of the battery and an external clip for fastening the internal clip to the pole as well as for mechanical stabilization of the internal clip. Here, the internal clip is designed for current transmission and the external clip is designed for receiving or positioning a fastening screw and for stabilizing, clamping or fixing the internal clip.

The object of the invention is to specify an electrical contact unit for producing an electrical connection between a battery and an on-board electrical system of a vehicle which is improved compared to the prior art, based on an improved pole cap or an improved battery and an improved terminal.

An electrical contact unit for producing an electrical connection between a battery and an on-board electrical system of a vehicle comprises a pole cap which can be arranged on the pole of a battery for providing a battery side contact surface, which can be connected to an on-board electrical system side contact surface in the form of a terminal.

The pole cap according to the invention is characterized in that it is formed as a sleeve-like cone in a portion which serves for contact connection with the terminal on the on-board electrical system side, the cone having an outer periphery widening conically in the direction of the fastening on the battery and an inner periphery tapering conically in the same direction. Due to this contacting portion of the pole cap being sleeve-like, the outer peripheral side contact surface is enlarged by the contact surface on the inner peripheral side. The functionality of the contact connection is improved by this surface which is thus enlarged for electrical contact connection. The pole cap according to the invention enables a contact surface which is enlarged compared to known pole caps for transmitting higher currents, such that an electrical connection between the battery, which is, in particular, a starter battery, and the on-board electrical system of the vehicle is improved compared to the prior art.

In order to be able to connect the pole cap—as a battery side contact element—to an on-board electrical system side terminal which provides an on-board electrical system side contact surface, a fastening portion having a recess is advantageously provided—centrally below the sleeve-like portion of the pole cap. An especially good and durable contact connection can be produced by the on-board electrical system side contact element being anchorable in the recess centrally below the sleeve-like portion, as the battery side contact element and the on-board electrical system side contact element can be effectively brought into contact with each other in this way. Here, various types of anchoring of the on-board electrical system side contact in the recess are conceivable: for example, by a self-cutting thread or by bracing.

If the central recess is provided in the fastening portion with an internal thread, the on-board electrical system side contact element can be connected to the pole cap by means of a screw in an especially simple, secure and repeatedly reliable manner.

The battery according to the invention has at least one pole cap according to the invention. The battery according to the invention thus necessarily demonstrates all properties and advantages of the pole cap according to the invention with regards to an improved contact connection to the on-board electrical system.

The terminal for providing an on-board electrical system side contact surface for connection to a battery pole, which is equipped with a pole cap as described above as a battery side contact surface, is formed according to the invention as a double-walled terminal sleeve having an inner and an outer wall which are supported by an annular collar, wherein the walls form an annular gap tapering towards the collar for positively receiving the sleeve-like portion of the pole cap described above.

Due to the terminal being sleeve-like, a larger on-board electrical system side surface is provided for the electrical contact connection, such that the enlarged contact surface on the sides of the sleeve-like portion of the pole cap can be optimally utilized during a contact connection. The terminal according to the invention thus also enables an improved electrical connection compared to the prior art, in particular for transmitting higher currents, between a battery and an on-board electrical system of a vehicle.

An especially good contact connection is enabled when the outer wall of the on-board electrical system side contact surface in the shape of the terminal is formed to fit the outer periphery of the pole cap exactly and the inner wall is formed to fit the inner periphery of the pole cap exactly. This embodiment ensures the tightest connection between the battery side and on-board electrical system side contact element and, thus, the best functionality with regards to the current flow.

An especially advantageous form of the connection of the terminal to the pole cap is achieved when the terminal can be frictionally connected by means of a centrally arranged fastening screw in the recess of the fastening portion fitted with an internal thread. If the battery side recess is also arranged centrally relative to the sleeve-like contacting portion, the respective contact surfaces will thus be simultaneously pressed against one another during the screw connection of terminal and pole, which serves for the durability and repeatability of the connection.

A further advantageous embodiment of the screw connection is if the annular collar of the terminal sleeve has an annular stop on its upper inside, with which stop the terminal is pressed against the sleeve-like contacting portion of the pole cap by a flange of the fastening screw during a fastening to the pole cap. Furthermore, the surface in which flange and stop come into contact with each other during the screw connection provides additional friction and thus a more fixed connection.

The electrical contact unit according to the invention for producing an electrical connection between a battery and the on-board electrical system of a vehicle is generated with the aid of a battery according to the invention, having a pole cap according to the invention as a battery side contact surface and a terminal according to the invention as an on-board electrical system side contact surface, whereby pole cap and terminal are connected to each other as described above. The electrical contact unit according to the invention thus has all properties and advantages which are described above with regards to the pole cap and the terminal.

The exemplary embodiments of the invention are illustrated in more detail below by means of drawings.

DETAILED DESCRIPTION OF THE DRAWINGS

Parts that correspond to one another are provided with the same reference numerals in all figures.

Figure 1:
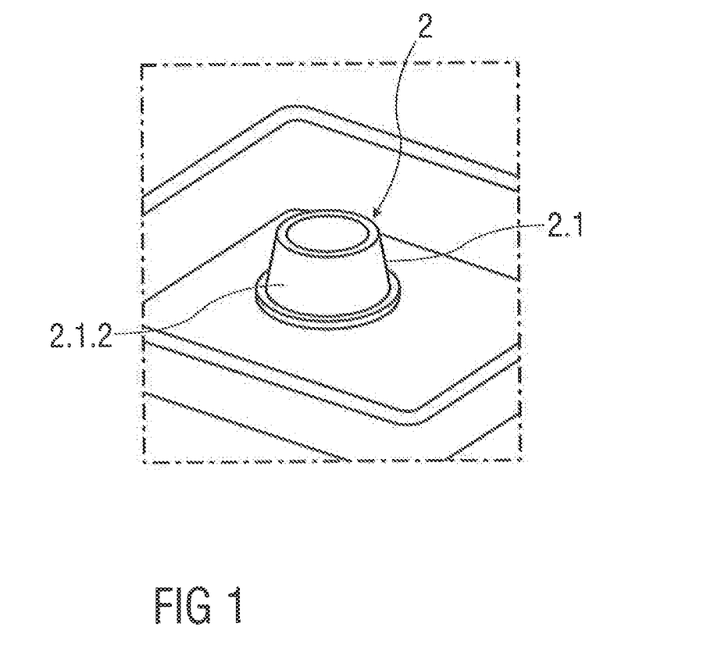
FIG. 1 is a schematic perspective depiction of a battery side contact surface having a pole cap.
Figure 2:
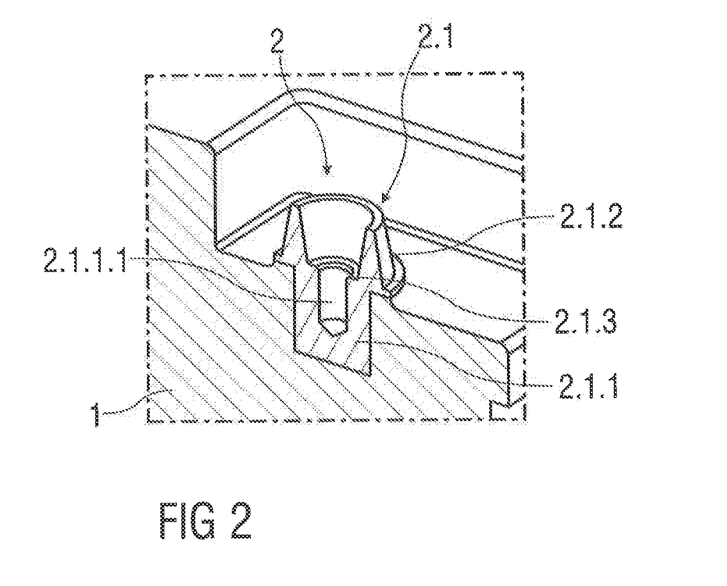
FIG. 2 is a schematic sectional depiction of the battery side contact surface according to FIG. 1.

FIGS. 1 and 2 each schematically show a pole cap 2.1 connected to a battery pole 1, the pole cap 2.1 providing a battery side contact surface 2 for producing an electrical connection between the battery pole 1 and an on-board electrical system of a vehicle which is not depicted in more detail. FIG. 1 thus shows the pole cap 2.1 in a perspective depiction and FIG. 2 in a schematic depiction, in particular in a longitudinal section.

The battery pole 1 is, for example, an electrical pole of a starter battery of a vehicle, the starter battery not being depicted in more detail and supplying electricity to an output unit and to further vehicle components integrated into the on-board electrical system.

The pole cap 2.1 is electrically conductively connected to the battery pole 1 and is expediently formed from an electrically conductive material, e.g., metal. The pole cap 2.1 has a fastening portion 2.1.1 facing towards the battery pole 1 and a sleeve-like contacting portion 2.1.2 facing away from the battery pole 1.

The fastening portion 2.1.1 is provided with a pole cap side recess 2.1.1.1 extending in the axial direction, into which, for example, a thread which is not depicted in more detail, e.g., an internal thread, is introduced, or which provides a non-profiled surface for producing a profile connection to a self-tapping thread. An end of the pole cap side recess 2.1.1.1, the end facing towards the battery pole 1, is formed herein to taper.

The sleeve-like contacting portion 2.1.2 is—seen from above—formed by an outer periphery widening conically in the direction of the battery pole 1 and an inner periphery tapering conically in the direction of the battery pole 1, whereby the battery side contact surface 2 is enlarged in comparison to the prior art and higher currents can be transmitted.

A through opening formed by the sleeve-like shaping of the contacting portion 2.1.2 is enlarged in diameter in comparison to the pole cap side recess 2.1.1.1, such that a pole cap side stop 2.1.3 is formed in the transition region between the fastening portion 2.1.1 and the sleeve-like portion 2.1.2, the stop extending in the peripheral direction and forming an annular stop surface according to the exemplary embodiment shown, which will be discussed in more detail later.

Figure 9:
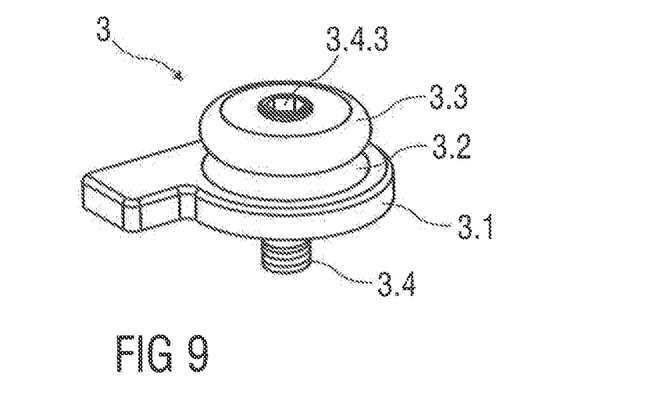
FIG. 9 is a schematic perspective depiction of an on-board electrical system side contact surface formed from the contact clip, the terminal sleeve, the fastening screw and the cover element.
Figure 10:
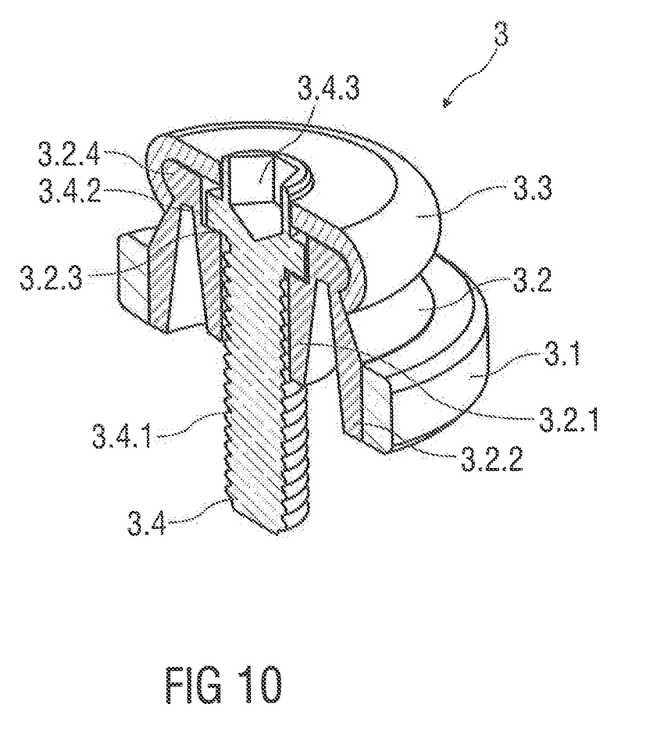
FIG. 10 is a schematic sectional depiction of the on-board electrical system side contact surface.

In FIGS. 3 to 8, components of an on-board electrical system side contact surface are depicted, which are described individually below. Subsequently, the on-board electrical system side contact surface which is achieved by a terminal 3 shown in FIGS. 9 and 10 is described in more detail in connection with the components described earlier.

Figure 3:
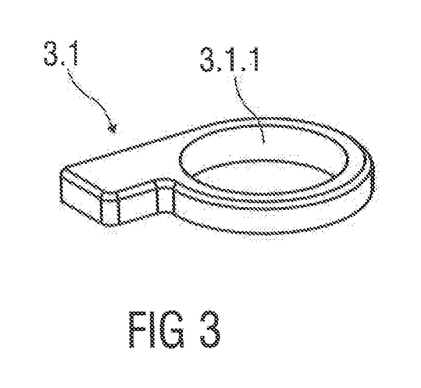
FIG. 3 is a schematic perspective depiction of a contact clip.

FIG. 3 shows a contact clip 3.1 in a perspective depiction.

The annular contact clip 3.1 has a recess 3.1.1. The contact clip 3.1 is electrically conductively connected to at least one connection element of the on-board electrical system, the connection element not being depicted here, for producing an electrical connection between the battery pole 1 and the on-board electrical system. Expediently, the contact clip 3.1 is here formed from an electrically conductive material, e.g., metal.

Figure 4:
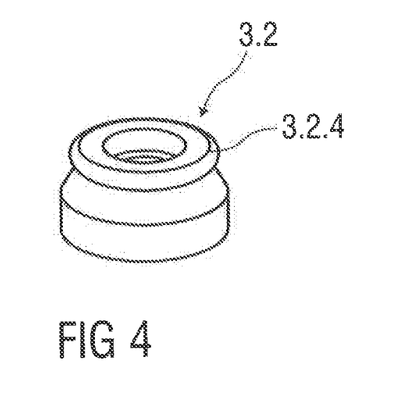
FIG. 4 is a schematic perspective depiction of a terminal sleeve.
Figure 5:
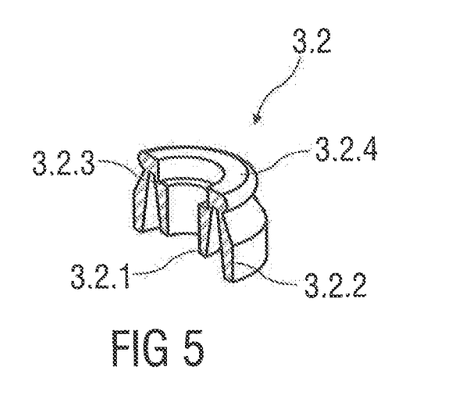
FIG. 5 is a schematic sectional depiction of the terminal sleeve according to FIG. 4.

FIGS. 4 and 5 each depict a terminal sleeve 3.2, wherein the terminal sleeve 3.2 is shown in a perspective depiction in FIG. 4 and in a sectional depiction in FIG. 5, in particular in a longitudinal section.

The terminal sleeve 3.2 is formed double-walled having an inner wall 3.2.1 and an outer wall 3.2.2 which open into an annular collar 3.2.4 on their upper end. A gap for positively receiving the sleeve-like contacting portion 2.1.2 of the pole cap 2.1 is formed between the walls. The terminal sleeve 3.2.4 is presently formed as one-piece.

In the embodiment depicted, the outer periphery of the outer wall 3.2.2—seen from above—has a portion widening conically or in a tapering manner and an adjoining consistently or cylindrically extending portion, the latter facing towards the pole cap 2.1. The inner periphery of the outer wall 3.2.2 is formed correspondingly to the outer circumference of the sleeve-like contacting portion 2.1.2 or formed to fit it exactly and thus runs in the direction of the pole cap 2.1 in a conically widening manner.

With regards to the inner wall 3.2.1, the radius which is remote from the center of the rotationally symmetrical terminal sleeve 3.2 is referred to below as the "outer periphery" and the radius located closer to the center is referred to as the "inner periphery".

An outer periphery of the inner wall 3.2.1 is formed correspondingly to the inner periphery of the pole cap 2.1 or formed to fit it exactly and runs—seen in the direction of the pole cap 2.1—in a conically tapering manner. The inner periphery of the inner wall 3.2.1 is presently cylindrical.

Furthermore, a stop 3.2.3 is formed inside the annular collar 3.2.4 at the transition to the inner wall 3.2.1 on the terminal sleeve side, the stop forming an annular stop surface for a screw connection or similar according to the exemplary embodiment shown.

Figure 6:
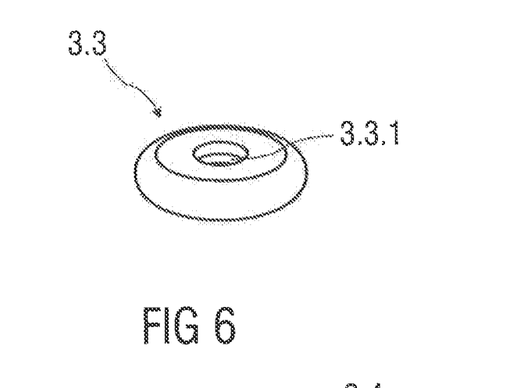
FIG. 6 is a schematic perspective depiction of a cover element.
Figure 7:
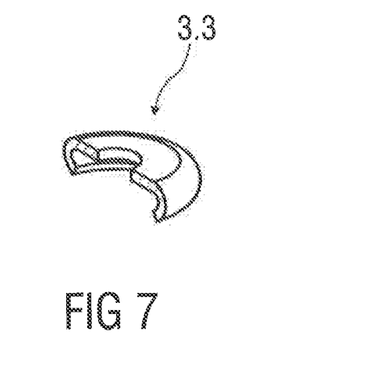
FIG. 7 is a schematic sectional depiction of the cover element according to FIG. 6.

Moreover, a collar 3.2.4 for producing a crimped connection to a cover element 3.3 shown in FIGS. 6 and 7 is formed on an end of the terminal sleeve 3.2, the end facing away from the pole cap 2.1.

Figure 8:
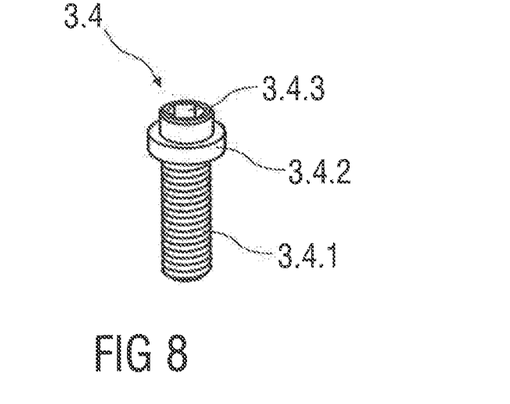
FIG. 8 is a schematic perspective depiction of a fastening screw.

FIGS. 6 and 7 show the cover element 3.3, which is formed as a crimped cover for producing the aforementioned crimped connection and which has a cover side recess 3.3.1 for receiving a fastening screw 3.4 shown in FIG. 8.

FIG. 8 shows the fastening screw 3.4 in a perspective depiction.

The fastening screw 3.4 is provided with the external thread 3.4.1, which, in the assembled state of the electrical contact unit E, is in operative engagement with the thread in the pole cap side recess 2.1.1.1.

A flange 3.4.1 enlarging a diameter of the fastening screw 3.4 is formed—again seen in relation to the fastening on the pole cap—on an end region of the fastening screw 3.4, the end region facing away from the pole cap 2.1. Furthermore, the fastening screw 3.4 according to the exemplary embodiment shown is formed with an internal hexagon socket drive profile 3.4.3 for a simple assembly and disassembly of the electrical contact unit E, as described in more detail later.

The components described above form the on-board electrical system side terminal 3 in the assembled state, as exemplified in FIGS. 9 and 10.

Here, the on-board electrical system side terminal 3 is depicted in the assembled state in FIG. 9 in a perspective depiction and in a sectional depiction in FIG. 10, in particular in a longitudinal section.

Here, the components are connected to one another in the following manner:

The annular contact clip 3.1 with its recess 3.1.1 engages the uniformly or cylindrically running portion of the outer periphery of the outer wall 3.2.2 of the terminal sleeve 3.2, such that these are positively and electrically conductively connected to each other, wherein the annular recess 3.1.1 of the contact clip 3.1 is narrowed—for example by means of a screw which is not shown—and clamps the terminal sleeve 3.2, such that a frictional connection forms between the contact clip 3.1 and the terminal sleeve 3.2. The contact between terminal sleeve 3.2 and contact clip 3.1 can also be produced by compressing, welding or soldering.

The fastening screw 3.4 is arranged through the cover side recess 3.3.1 and through the terminal sleeve 3.2, wherein a region of the fastening screw 3.4, the region comprising the external thread 3.4.1, protrudes portionally out of the terminal sleeve 3.2 and an end of the fastening screw 3.4 comprising the hexagon socket drive profile 3.4.3 is flush with the cover element 3.3. The flange 3.4.2 of the fastening screw 3.4 rests on the terminal sleeve side stop 3.2.3.

The cover element 3.3 is frictionally connected to the cover element 3.2 for fixing the fastening screw 3.4 within the on-board electrical system side terminal 3 by a crimped edge of the cover element 3.3 enclosing the collar 3.2.4 being arranged on the terminal sleeve 3.2. After the arranging of the cover element 3.3, the fastening screw 3.4 cannot be moved through the cover side recess 3.3.1 due to the flange 3.4.2 having an enlarged diameter, such that the fastening screw 3.4 is fixed in the on-board electrical system side terminal 3 in a captive manner yet is rotatable with respect to terminal sleeve and cover element. Since the cover element 3.3 is additionally frictionally connected to the terminal sleeve 3.2 and this terminal sleeve 3.2 is in turn frictionally connected to the contact clip 3.1, the on-board electrical system side terminal 3 can be connected as a structural unit to the battery side contact surface 2.

Figure 11:
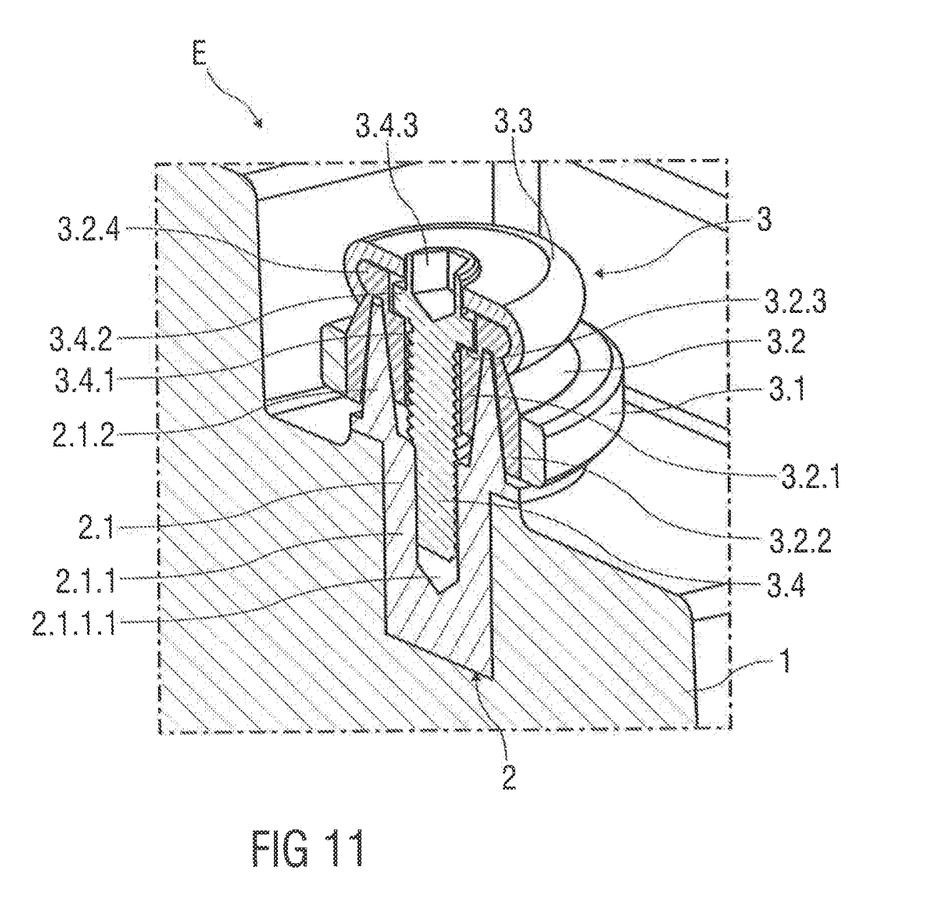
FIG. 11 is a schematic sectional depiction of an exemplary embodiment according to the invention of an electrical contact unit formed from the on-board electrical system side contact surface and the battery side contact surface.

FIG. 11 shows an electrical contact unit E which is formed by connection of the on-board electrical system side contact surface to the battery side contact surface 2.

The on-board electrical system side terminal 3 is frictionally connected to the battery side sleeve-like contacting portion 2.1.2 by screwing. Here, a portion of the external thread 3.4.1 of the fastening screw 3.4 engages with the thread of the pole cap side recess 2.1.1.1. The sleeve-like contacting portion 2.1.2 of the pole cap 2.1 is positively received by the gap between the inner wall 3.2.1 and the outer wall 3.2.2.

When a certain force is exerted by the fastening screw 3.4 when producing the screw connection between the on-board electrical system side terminal 3 and the battery side contact surface 2, the inner wall 3.2.1 can be pressed radially outwards as a result of the inner periphery of the inner wall 3.2.1 running in a conically tapering manner in the direction of the pole cap 2.1, by means of which a clamping connection is additionally produced between the pole cap 2.1 and the terminal sleeve 3.2.

Figure 12:
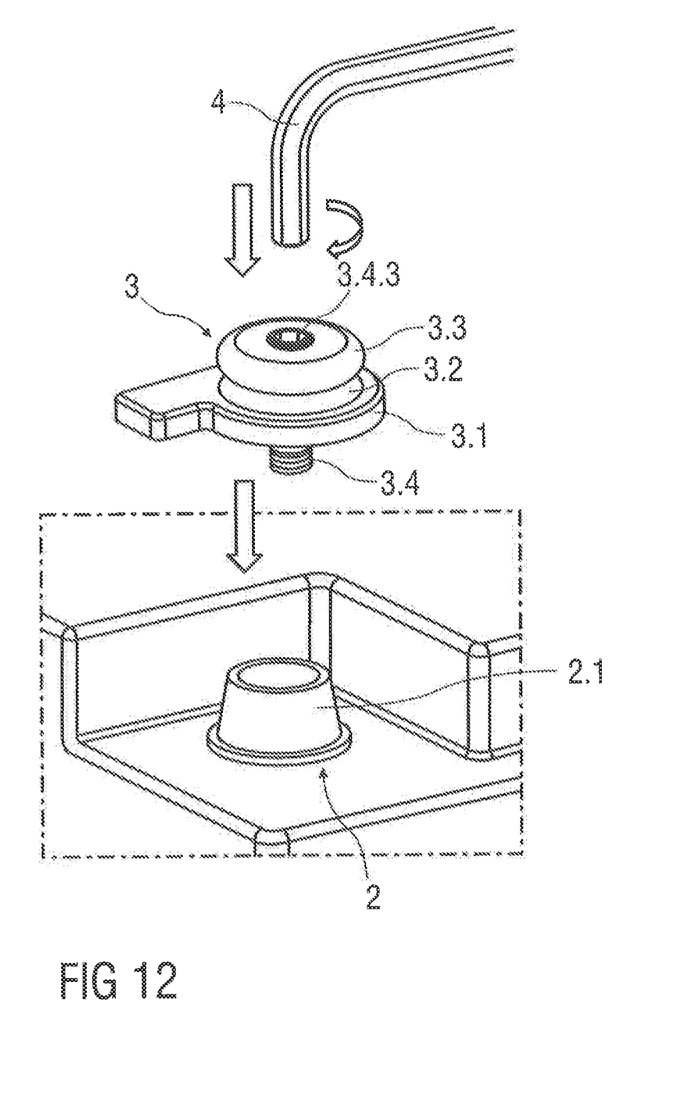
FIG. 12 is a schematic perspective depiction of the on-board electrical system side contact surface and the battery side contact surface in an assembly step for producing a screw connection.

FIG. 12 shows an assembly step before the assembling of the electrical contact unit E, wherein a direction for the on-board electrical system side terminal 3 is predetermined by means of an axial arrow, in which direction the terminal 3 is moved towards the pole cap 2 and is arranged on this for assembly. A further axial arrow gives a movement direction of a hex wrench 4 for introduction into the hexagonal socket drive profile 3.4.3 of the fastening screw 3.4. A curved arrow gives a direction of rotation, here clockwise, for the hex wrench 4, for producing the screw connection between the on-board electrical system side contact surface in the form of the terminal 3 and the battery side contact surface 2 in the form of the sleeve-like contacting surface 2.1.2.

Figure 13:
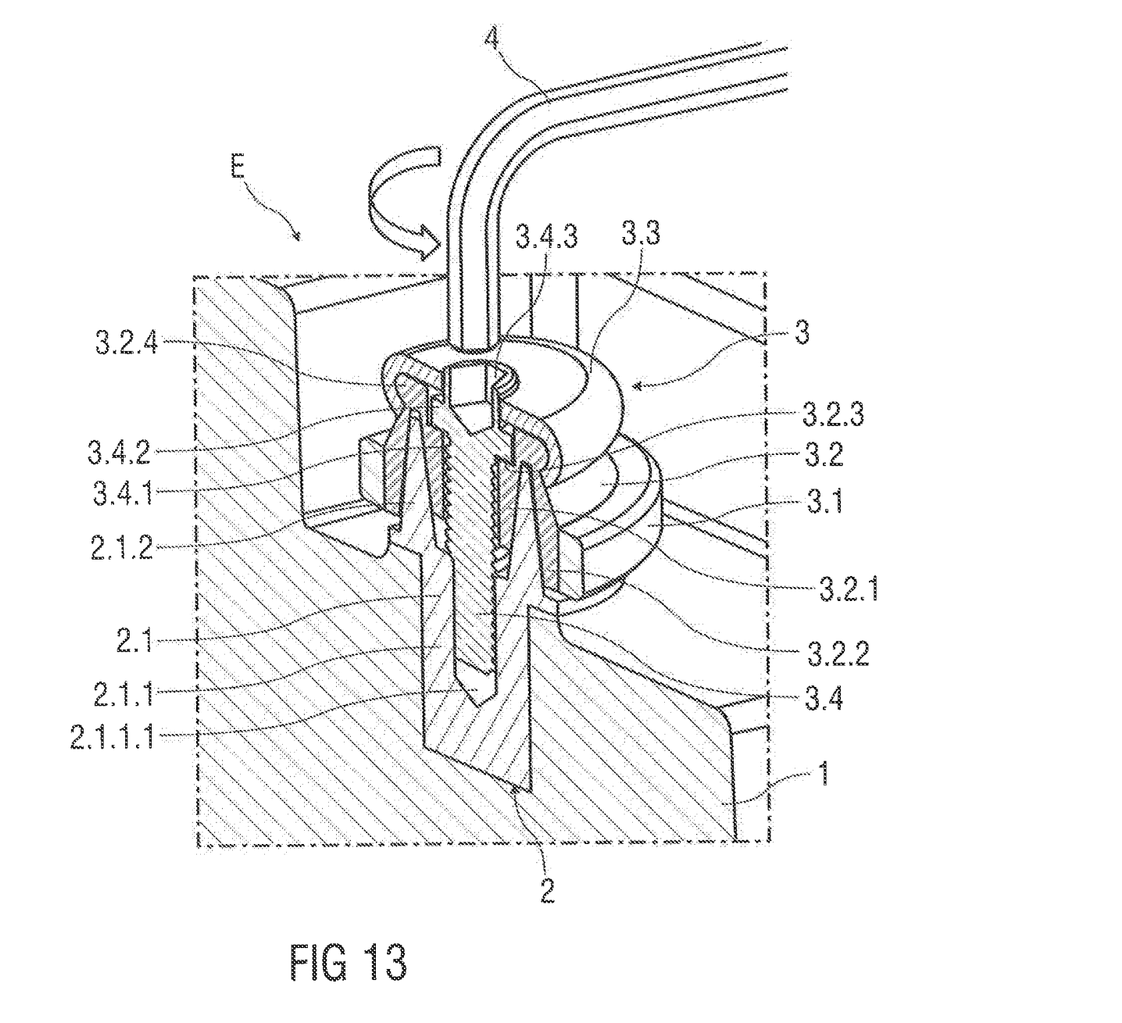
FIG. 13 is a schematic perspective depiction of the on-board electrical side contact surface and the battery side contact surface in a disassembly step for releasing the screw connection.

FIG. 13 shows a disassembly step for releasing the screw connection between the on-board electrical system side terminal 3 and the battery side contacting portion 2.1.2, wherein a direction of rotation of the hex wrench 4 is provided counter-clockwise.

Figure 14:
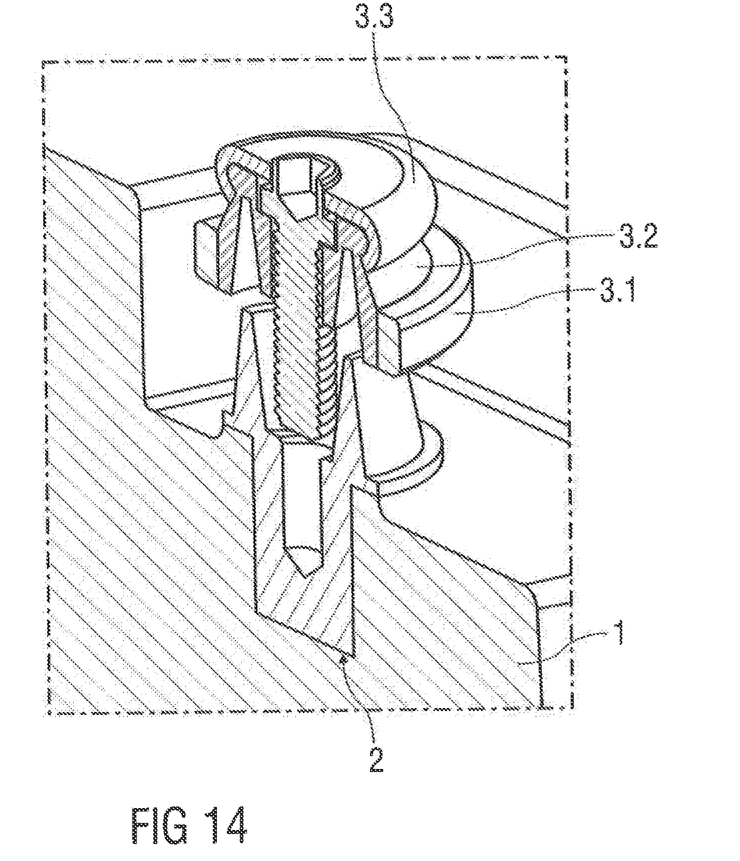
FIG. 14 is a schematic perspective depiction of the on-board electrical system side contact surface and the battery side contact surface after the assembly step according to FIG. 13.

FIG. 14 shows the on-board electrical system side terminal 3 and the battery side contacting portion 2.1.2 after the disassembly step shown in FIG. 13, wherein the terminal 3 is released from the battery side contact surface 2 as a structural unit.

The invention claimed is:

1. A pole cap of a battery pole of a battery of a vehicle, comprising:
   a fastening portion; and
   a contacting portion, wherein the contacting portion has an outer periphery which is continuously conically widening in a direction of the fastening portion along an entire length of the outer periphery from a distal top end of the contacting portion to a proximal end of the contacting portion at an annular stop surface of the pole cap, wherein the annular stop surface is disposed in a transition region between the fastening portion and the contacting portion, and has an inner periphery which is continuously conically narrowing in the direction of the fastening portion along an entire length of the inner periphery from the distal top end of the contacting portion to the proximal end of the contacting portion at the annular stop surface of the pole cap, and wherein the continuously conically widening outer periphery and the continuously conically narrowing inner periphery define a battery side contact surface therebetween such that the battery side contact surface is enlarged so that higher currents can be transmitted between the battery and an on-board electrical system of the vehicle.

2. The pole cap according to claim 1, wherein the fastening portion is disposed centrally below the contacting portion and wherein the fastening portion defines a recess.

3. The pole cap according to claim 2, wherein the recess has an internal thread.

4. A battery having at least one pole cap according to claim 1.

5. A terminal for connection to a battery pole which is equipped with the pole cap according to claim 1, comprising:
   a double-walled terminal sleeve, wherein the double-walled terminal sleeve has an inner wall and an outer wall, wherein both the inner wall and the outer wall are supported by an annular collar, and wherein the inner wall and the outer wall form an annular gap tapering towards the annular collar for positively receiving the contacting portion of the pole cap.

6. The terminal according to claim 5, wherein the outer wall is formed to fit the outer periphery of the contacting portion of the pole cap exactly and wherein the inner wall is formed to fit the inner periphery of the contacting portion of the pole cap exactly.

7. The terminal according to claim 5, wherein the terminal is frictionally connectable to the pole cap by a central fastening screw in a recess with an internal thread that is defined by the fastening portion of the pole cap that is disposed centrally below the contacting portion.

8. The terminal according to claim 7, wherein the annular collar of the double-walled terminal sleeve has an annular stop on an upper inner side and wherein with the annular stop the terminal is pressable against the contacting portion of the pole cap by a flange of the central fastening screw.

* * * * *